United States Patent
Larsson et al.

(10) Patent No.: US 9,272,703 B2
(45) Date of Patent: Mar. 1, 2016

(54) VEHICLE DRIVE TRAIN CONTROL METHOD AND SYSTEM

(75) Inventors: Lena Larsson, Västra Frölunda (SE); Jan Öberg, Göteborg (SE); Filip Alm, Bohus (SE)

(73) Assignee: Volvo Lastvagnar AB, Göteborg (SE)

( * ) Notice: Subject to any disclaimer, the term of this patent is extended or adjusted under 35 U.S.C. 154(b) by 0 days.

(21) Appl. No.: 14/382,376

(22) PCT Filed: Mar. 9, 2012

(86) PCT No.: PCT/EP2012/001054
§ 371 (c)(1),
(2), (4) Date: Nov. 10, 2014

(87) PCT Pub. No.: WO2013/131532
PCT Pub. Date: Sep. 12, 2013

(65) Prior Publication Data
US 2015/0105992 A1    Apr. 16, 2015

(51) Int. Cl.
*B60T 7/12* (2006.01)
*G05D 1/00* (2006.01)
(Continued)

(52) U.S. Cl.
CPC .............. *B60W 20/1088* (2013.01); *B60K 6/12* (2013.01); *B60K 23/0808* (2013.01);
(Continued)

(58) Field of Classification Search
CPC ...... B60K 23/0808; B60K 6/12; B60K 28/16; B60W 30/18027; B60W 20/1088
USPC .......................................................... 701/89
See application file for complete search history.

(56) References Cited

U.S. PATENT DOCUMENTS

| 5,491,635 A * | 2/1996 | Foeldi et al. ................. 701/113 |
| 2006/0197375 A1 | 9/2006 | Delaney |
| 2010/0217489 A1* | 8/2010 | Turski et al. .................... 701/48 |

FOREIGN PATENT DOCUMENTS

| EP | 0224144 A1 | 6/1987 |
| EP | 0638454 A1 | 2/1995 |

(Continued)

OTHER PUBLICATIONS

International Search Report (Nov. 28, 2012) for corresponding International Application PCT/EP2012/001054.
(Continued)

*Primary Examiner* — Maceeh Anwari
(74) *Attorney, Agent, or Firm* — WRB-IP LLP

(57) ABSTRACT

A vehicle traction system includes a first traction wheel forming part of a first propulsion system including a mechanical drive train, a second traction wheel forming part of a second propulsion system including a hydraulic pump for powering a hydraulic motor, one sensor indicating a take-off condition, and a control unit for controlling the second propulsion unit. The control unit is programmed to automatically detect a take-off condition by the sensor and send an input to the control unit that a take-off condition is fulfilled, automatically provide a traction force from the second propulsion system in response to the indication that there is a take-off condition of the vehicle present and an indication that a traction is or will be provided by the first traction system, and automatically control the second propulsion unit by the control unit in dependence of the manually controlled torque from the first propulsion unit.

14 Claims, 2 Drawing Sheets

(51) Int. Cl.
*G06F 7/00* (2006.01)
*G06F 17/00* (2006.01)
*B60W 20/00* (2006.01)
*B60W 30/18* (2012.01)
*B60K 23/08* (2006.01)
*B60K 6/12* (2006.01)
*B60K 28/16* (2006.01)

(52) U.S. Cl.
CPC ......... *B60K 28/16* (2013.01); *B60W 30/18027* (2013.01); *B60W 2520/26* (2013.01); *B60W 2540/18* (2013.01); *B60W 2550/148* (2013.01); *B60W 2710/083* (2013.01); *B60W 2710/207* (2013.01)

(56) References Cited

FOREIGN PATENT DOCUMENTS

| | | | |
|---|---|---|---|
| EP | 1359041 | A2 | 11/2003 |
| FR | 2859671 | A1 * | 3/2005 |
| FR | 2859671 | A1 | 3/2005 |
| FR | 2954255 | A1 | 6/2011 |
| FR | 2954255 | A1 * | 6/2011 |

OTHER PUBLICATIONS

International Preliminary Report on Patentability (Jul. 2, 2014) for corresponding International Application PCT/EP2012/001054.

* cited by examiner

VEHICLE DRIVE TRAIN CONTROL METHOD AND SYSTEM

The invention relates, according to an aspect thereof, to a system and a method for a drive train control for vehicles. The invention is particularly directed, according to an aspect thereof, to the feature of controlling the vehicle and drive train during a vehicle take-off.

As is well known among drivers of motor vehicles is the fact that in the take-off operation of such a vehicle, situations can arise in which the torque from the driven wheels not is enough and the wheels may slip or not be running due to undesired take-off conditions preventing the vehicle from moving, e.g a heavy loaded vehicle trying to take-off in a steep uphill. In some cases may the vehicle actually start moving but the resistance may be so high such that there is a risk for burning a clutch arranged between an engine and gearbox of the vehicle or an undesired wear of the clutch will be the result of the take-off of the vehicle. The clutch arrangement may in these cases not be sufficiently controlled or dimensioned to manage the take-off operation without undue wear. Hence, it is desired to provide a take-off arrangement for a vehicle which may better manage a take-off operation for a vehicle, in particular for a heavy duty vehicle, when there is a rather large resistance for take-off of the vehicle, e.g. due to heavy load and/or inclination or road surface conditions.

It is desirable to provide a traction system and a method which improves the functionality of the take-off of a vehicle, in particular for a heavy road vehicle such as a trailer or a bus which in general is adapted to travel and perform its work on a road and mainly adapted to function in a normal traffic situation in a city or driving on a highway. The traction system is intended to be a part of a normally automatic or semiautomatic gear shift control system or as an automated feature of a normally manual gear shift system.

The traction system according to an aspect of the invention includes at least a first wheel, preferably a first pair of wheels on a first axle adapted to be driven by a first propulsion system, e.g. by a mechanical drive train comprising a gearbox connected to an internal combustion engine. The system further includes a second wheel, preferably a second pair of wheels which are driven by a second propulsion system, e.g. one or several hydraulic propulsion units which either may be configured such that a single motor propel a common axle for a pair of wheels or separate propulsion units for driving a single wheel respectively. The first and second propulsion systems are configured such that they may be controlled independently of each other. By being independently controlled is meant that the propulsion systems may be controlled such that either or both systems may be used at the same time and if both systems are used to provide a torque at the same time it is possible to control the torque from each traction system independently of each other. Hence, the invention is intended for a vehicle comprising an ordinary mechanical drive train powered by an internal combustion engine which is used as the main drive train. As an auxiliary propulsion unit is the vehicle provided with a hydraulic propulsion unit. A benefit with a hydraulic propulsion unit compared to for example an electric propulsion unit is that a more compact propulsion system may usually be designed, in particular if the vehicle already is provided with some kind of hydraulic system. A hydraulic propulsion system may thus more conveniently be mounted from start or retrofitted to a vehicle in most cases than an electric propulsion system, e.g. may a pair of hydraulic motors be connected to a pair of wheels of a non-driven axle. In one specific case, the hydraulic propulsion may be provided to a pair of steerable front wheels of a truck or bus which normally only is provided with driven rear, non-steerable axles.

The traction system further comprises at least one sensor for indicating a take-off condition. This sensor could be an already existing, sensor, e.g. some sensor indicating a speed of the vehicle, running of the engine, release of the parking brakes, engaging a gear and/or the engagement of a clutch. It is of course possible that several sensors are used together in order to indicate a take-off condition, e.g. that the engine is running, the clutch is engaged and a gear is engaged. Depending on the vehicle and the propulsion system, the appropriate sensors may be different, e.g. in some cases may there not be an ordinary, mechanical clutch present but some kind of hydrodynamic power transmitting system such as a torque converter or a continuously variable wet clutch wherefrom a sensed power transmission above a certain value may be used as a sensed take-off condition. It is also important to sense the direction of the intended take-off to be able to produce the hydraulic propulsion in the correct direction. This is preferably done by indicating if it is a forward or a rearward gear engaged.

The traction system also comprises a control unit for controlling said second propulsion unit. The control unit is connected to the sensor for indicating a take-off mentioned above. The control unit may of course be connected to a multitude of different sensors used for indicating a take-off condition. However, the sensors must not be directly connected to the control unit but may be values from some other control unit or data collecting device indicating relevant parameters to be used as a take-off indication.

The traction system control method comprises the steps of:—automatically provide a traction force from said second propulsion system in response to the indication that there is a take-off condition of the vehicle present and an indication that a traction is provided/will be provided by the first traction system;

automatically detecting if a take-off condition of the vehicle is present by a sensor and sending an input to the control unit that a take-off condition is fulfilled. As discussed above, the take-off of the vehicle may be defined in different ways and different conditions used as a take-off indication, e.g. the starting of the combustion engine, engagement of a clutch or a gear shift change from neutral or parking position to a gear or the movement of the vehicle;

automatically provide a traction force from said second propulsion system in response to the indication that there is a take-off condition of the vehicle present and an indication that a traction is provided/will be provided by the first traction system. Hence, the system shall be able to identify if there is a take-off condition present such that the driver not need to make any further driver inputs in order to make use of the take-off aid system. However, the system may be provided with a switch for selecting whether or not the automatic take-off aid shall be active and provide an additional torque during take-off of the vehicle. In some cases, the indication of a take-off condition and that there is a desired traction may be the same feature, e.g. the initiation of engagement of a clutch. In other cases, these may be different features, e.g.;

the sensed take-off condition may be the start of the combustion engine and;

the indication that a traction is provided or will be provided by the first traction system may be one or several of the following sensed conditions or actions:

the gear shift from neutral to a selected gear, the release of a brake,
an indication that the vehicle is moving (in the same direction as the selected gear indicates) or
engagement of a clutch.

Hence, there are a lot of different ways by which the skilled person in the art may detect a starting condition and use it for sending a signal to the control unit in order to send a start signal to the second traction system.

manually controlling the torque from the first propulsion unit. Hence, the torque from the first propulsion unit is controlled as usual by the normal control levers and control functions. In general, this means the vehicle is controlled by the speed control pedal (accelerator), brakes, clutch and gear shift controls as usual.

automatically controlling said second propulsion units by the control unit. Hence, the control unit is preferably programmed to automatically control the second propulsion unit. The control signals are preferably created in dependence on the control of the first propulsion unit. One purpose of the take-off aid system is that it shall automatically provide the take-off aid without the need for controlling still another control lever. The second control unit may for example be controlled by the control unit such that a torque is provided which is proportional to the torque provided by the first propulsion system. However, it could also be possible to provide a fixed torque if desired or a combination of these control strategies. For example, there may be a fixed minimum torque provided by the second propulsion system when the automatic take-off aid control system is activated and later on when the torque demand from the first propulsion system is above a certain limit will the torque from the second propulsion system increase and be proportional to the torque from the first propulsion system. This control algorithm may have the advantage that a relative strong torque from the second propulsion system is provided at the very first takeoff moment of motion of the vehicle which may reduce the wear of a clutch in the first, mechanical propulsion system while there in general does not exist the same problem for the second, hydraulic propulsion system. Hence, the above described system may thus provide an advantage not only when starting in uphill or when the vehicle is heavy loaded but providing useful help in essentially any starting condition by reducing wear of a clutch in the first mechanical propulsion system.

The drive train control system may further comprise sensors concerning traction of one or several wheels, e.g speed sensors for the individual wheels and a vehicle speed sensor such that traction from the wheels are sensed and slip may be detected. There may of course also be accelerometers which directly measures the acceleration of the wheels. The control unit may thus be programmed to reduce the torque onto the surface from the wheel(s) connected to the second, hydraulic traction system if there is a slip detected on the hydraulically driven wheels. The torque from the hydraulically driven wheels control may be controlled by providing a braking action on the slipping wheel, reducing the flow of the hydraulic liquid to the wheel (by having a flow restrictor and/or reducing the flow from the pump) or changing the displacement of the hydraulic motor (if it is provided with a variable displacement function). It is of course also possible to increase the torque on the hydraulically powered wheels if there is a slip detected on the mechanically powered wheels connected to the first propulsion system.

The take-off aid function will continue until a preprogrammed end of function criteria is fulfilled or manually deactivated. The end of function criteria may be the travelling beyond a certain distance in the same direction, a specified time limit or a vehicle velocity above a certain limit.

In one specific control algorithm, the hydraulically powered wheels are controlled to provide a constant torque at take-off when the take-off aid is activated and provide this torque until the torque from the mechanically driven wheels is above a certain limit where after the torque from the hydraulically driven wheels is increased proportionally to the torque from the mechanically driven wheels until the speed of the vehicle is above a certain limit.

In the following text, the system will be exemplified for a vehicle using a first pair of wheels driven by a mechanical drive train connected to an internal combustion engine and a second pair of wheels which are driven hydraulically.

DETAILED DESCRIPTION

Figure 1:
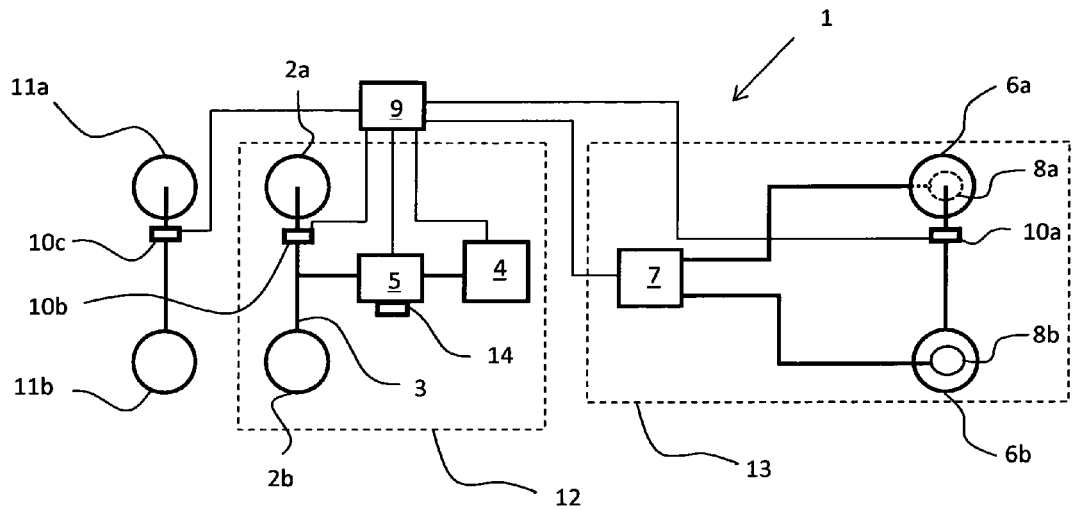
FIG. 1 A schematic overview of a propulsion system for a vehicle provided with two propulsion units where the invention can be implemented.

In FIG. 1 is shown a schematic view of a traction system 1 for a heavy load carrying truck. The traction system 1 comprises a first mechanical propulsion system 12 and a second hydraulic propulsion system 13. The first mechanical propulsion system 12 comprises a pair of traction wheels (2a, 2b) which are located on a rear, driven axle 3 which is powered by an internal combustion engine (ICE) 4. The rear, driven axle 3 is connected to the ICE 4 via a gearbox 5. The gearbox 5 may be a stepped gearbox that is manual or automatic (such as an Automatic Mechanical Transmission (AMT)) and the mechanical drive train may comprise a gearbox that is a Double Clutch Transmission (DCT) in order to reduce the time for a change of gear. The second, hydraulic propulsion system 13 further comprises a second pair of traction wheels 6a, 6b, the front wheels, which are driven by a pair of hydraulic motors 8a, 8b which are connected to and powered by a hydraulic pump 7. The traction system 1 also comprises a control unit 9 which is connected to the ICE 4, the gearbox 5 and the hydraulic pump 7. Even though it is not necessary for the control unit 9 to be connected to the ICE 4 and gearbox 5, it is considered to be beneficial for providing a desired control of the hydraulic propulsion system 13. The control unit could of course also be connected to other parts of the propulsion systems 12, 13, e.g. it may be connected to the hydraulic motors 8a, 8b in order to send output signals to control valves in the motors 8a, 8b. The control unit 9 is also connected to speed sensors 10a, 10b, 10c for indicating the speed of the front driven wheels 6a, 6b, the rear driven wheels 2a, 2b and a pair of rear, non-driven wheels 11a, 1ib. These sensors could be replaced for or used together with further sensors used for sensing a starting condition and control of the hydraulic propulsion unit, e.g. the control unit may be connected to sensors for sensing the gear shift position, the clutch status and/or the combustion engine speed or output torque. The control unit 9 may further be connected to a switch which may be used for turn on/turn off the automatic take-off aid control system. However, these speed sensors 10a, 10b, 10c may be used for indicating a take-off condition of the vehicle as well as for controlling the output torque from the hydraulic propulsion system 13. The take-off aid control system of the invention will now be exemplified by means of the schematic propulsion system 1 shown in FIG. 1.

In the above described system, the wheel speed sensors 10a, 10b, 10c may be used for the control of the take-off aid system. For example, the control unit 9 may send a control signal to the hydraulic pump 7 to start to pump a flow of hydraulic liquid to the hydraulic motors 8a, 8b in response to a sensed speed signal from either of the speed sensors 10a, 10b, 10c indicating that the velocity accelerates from standstill in a forward or reverse direction. The flow shall thus be controlled to flow in a desired direction such that a torque from the hydraulically driven wheels 6a, 6b cooperate to provide a torque in the same direction. The control of the driving direction of the hydraulically propelled wheels may be controlled in different ways depending on the system used, e.g. may the flow direction change by using a hydraulic pump able to provide a flow in different directions or by the use of one or several valves which may be controlled to change the flow direction of the hydraulic flow through the hydraulic motors. The torque from the hydraulic motors may be controlled by a pump having a variable displacement, controlling the rotational speed of the hydraulic pump, having variable displacement of the motors or controlling the hydraulic flow by by-pass valves or flow restrictors. Hence, there is a multitude of different ways of controlling the hydraulically driven wheels so as to provide a desired magnitude of the torque in the desired direction.

Still another way of controlling the automatic take-off aid function and sensing a take-off condition may be the use of information from the gearbox/and or the clutch. In FIG. 1 is a gear sensor 14 schematically shown associated with the gearbox 5. This sensor 14 may thus sense the gear shift position and may for example send a signal to provide a torque from the hydraulic propulsion system 13 when the gear is shifted from neutral to a forward or reverse gear. In case there is a clutch present in the mechanical drive train, the sensor 14 (or another sensor) may be configured to sense that clutch engagement has been initiated and thus send a signal indicating that a take-off condition is present. A similar sensor could of course also be used for sensing the degree of engagement of the clutch, or in the case as torque converter or hydrodynamic clutch is provided, indicate a take-off condition when such an arrangement is connected to provide a torque above a certain level. It is also possible to sense the torque produced by the ICE since this is mainly transferred via the clutch to the transmission.

In order to decide if the automatic take-off aid control system shall be switched on may there either be an automatic function or a manually switch on function. When driving during normal condition such an automatic switch on feature of the automatic take-off function should normally be turned off.

This automatic switch on function is generally thought to be active only during take-off conditions. The function could for example be automatically turned off above a certain speed limit, e.g. 15 km/h.

The traction system of the vehicle may comprise further driven wheels, either included in the described propulsion systems or being part of an additional, third propulsion system. However, an additional pair of wheels should most likely be integrated in the already existing systems. For example, the non-driven rear wheels 11a, 1ib and/or the front wheels powered by the hydraulic system may also be connected to the mechanical propulsion system 13. It is also obvious that hydraulic motors 6a, 6b could be located at any of the rear wheels 2a, 2b, 11a, 11b instead of, or in addition to, be located at the front wheels 6a, 6b. Hence, the specific configuration may vary within the scope of invention as long as there is at least one wheel, or pair of wheels, connected to a first propulsion unit such as a mechanical drive train powered by an ICE, and at least another wheel, or a pair of wheels, connected to another propulsion unit powered by hydraulic motors. An advantage by using a hydraulic system is that it is in general easier to implement an additional propulsion system onto non-powered wheels, in particular to steerable wheels, compared to adding an electric motor or providing the wheels with a mechanical drive.

An advantage with providing a vehicle having a main propulsion system 12 in the form of a mechanical drive train powered by an ICE 4 with a secondary propulsion system 13 in the form of hydraulic motors 8a, 8b is that the combination provides for an efficient propulsion in normal use from the mechanical propulsion system while the hydraulic propulsion system may be used when there is a desire for an additional force, e.g when starting from standstill. It is in particular an advantage that at least a first pair of wheels 2a, 2b are powered by the mechanical drive train connected to ICE 4 while another, second wheel or wheel pair 6a, 6b are powered by a hydraulic motor 8a, 8b. By using propulsion on several wheels may the traction be improved and there is less risk for wheel slip. It is particularly advantageous to provide the steerable front wheels with the hydraulic propulsion system since it is rather easy to fit in hydraulic hub motors compared to provide a mechanical driven axle, which is rather complicated for steerable axles, or using electric wheel motors, which in general are more bulky and heavier if the same torque is desired.

Figure 2:
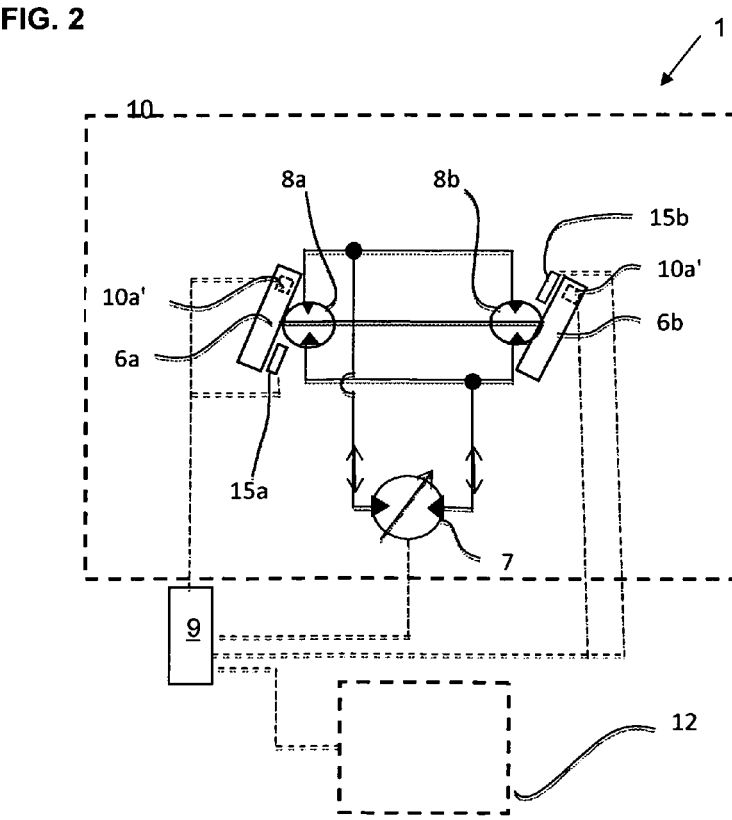
FIG. 2 Describes a suitable hydraulic system which may be used for the propulsion system in FIG. 1.

As briefly discussed above, different hydraulic propulsion systems may be used for the invention. In FIG. 2 is a suitable hydraulic system schematically described which may be used for the propulsion system in FIG. 1. In FIG. 2, the details of the mechanical propulsion system 12 has been left out and the mechanical propulsion system 12 is only disclosed to show it is a part of the overall propulsion system and connected to the control unit 9 to send input signals to the control unit 9 to be processed and used for calculation of control outputs to the hydraulic propulsion system, i.e. to the pump 7 and possibly other units, e.g. wheel brakes 15a and 15b. The system described herein is a robust system which has been stripped of and simplified to involve a minimum of devices and features in order to be able to fit on a vehicle as a secondary propulsion system intended to only be used as an additional power source during certain circumstances. As previously described, the vehicle comprises a second pair of steerable traction wheels 6a, 6b mounted on a front axle and each wheel 6a, 6b is provided with a hydraulic motor 8a, 8b which are connected to a hydraulic circuit comprising a hydraulic pump 7. The pump 7 is in this system a reversible variable displacement pump connected in closed loop configuration. The pump may be driven directly by the ICE.

Hence, the pump, which is controlled by an Electronic Control Unit (ECU) 9, may thus be controlled to direct the flow in a desired direction by reversing the flow and may also be used to control the magnitude of the flow easily by changing its displacement. The ECU 9 is further connected to several different kinds of sensors such as front wheel speed sensors 10a', 10a'' and to relevant sensors of the mechanical propulsion system 12. In order to keep the hydraulic traction system as simple as possible are the hydraulic motors 8a, 8b connected in parallel such that both motors 8a, 8b receive hydraulic fluid at the same pressure and no valves or restrictors are present in the system. One advantage by using this hydraulic system with parallel motors is that there will automatically be compensated for different rolling radius of the individual wheels 6a, 6b, e.g if the vehicle is started while turning will the same pressure be present in both wheels and the same torque provided to both wheels. In order to avoid a loss of traction from the hydraulic powered wheels 6a, 6b due to a wheel slip, which may cause a power loss of both wheels in a parallel arrangement, may the ECU 9 be connected to a pair of front wheel brakes 15a, 15b for control of their braking operation. A wheel slip may for example be detected by comparing the wheel speeds of the hydraulically powered front wheels 6a, 6b and the comparing may in this case include corrections for the wheel speed difference due to a turning action of the vehicle. It is also possible to compare the from wheel speeds with other wheel speed on other axles on the truck (e.g. non driven axles) or a ground speed sensor (ground radar, GPS etc). As shown, the ECU 9 is connected to mechanical traction system 12 and may for example receive relevant inputs such as the rotational speed of the engine and/or the gearshift position in order to decide the torque output of the mechanical propulsion system and thus control the hydraulic propulsion unit in dependence of the torque from the rear driven wheels (see FIG. 1).

The specific control algorithm may thus be realized in a multitude of different ways. In general, it is desirable to provide a torque from both the wheels driven by the first propulsion system and the second propulsion at essentially the same time. However, due to practical issues, it may be easier, or even necessary to provide a torque from either system slightly before it is provided by the other propulsion system. In view of the alternative, i.e. to not be able to provide an additional torque at all at start-up and automatically control the torque from a second propulsion system, the benefits are obvious. Hence, even though it is desirable to control the torque at take-off to be provided simultaneously by the different propulsion systems, and control the torque to be properly divided between the individual traction wheels in order to optimize traction, will also a very basic control system including a traction aid by the second propulsion system provide a considerable improvement at take-off. A more sophisticated control system including input parameters such as load conditions, surface conditions (mud, ice, sand), slip detectors, torque sensors will of course improve the possibility to enhance a more accurate control of the take-off function and provide an improved overall vehicle control during take-off.

Figure 3:
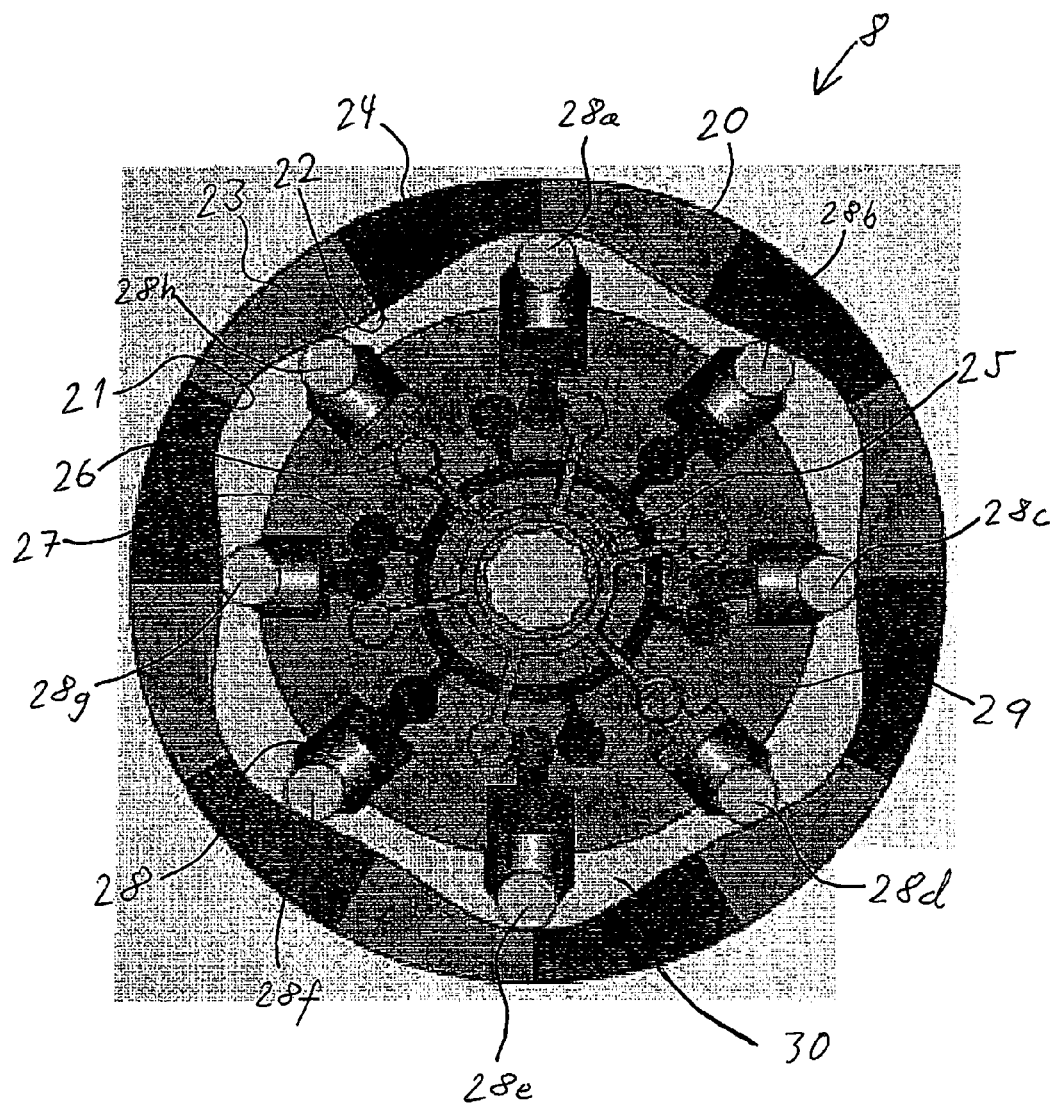
FIG. 3 Describes a schematic figure of an axial cross sectional view of a hydraulic motor

In FIG. 3 is shown a schematic figure of an axial cross sectional view of a hydraulic motor 8 suitable for the system disclosed in FIG. 1. The hydraulic motor 8 comprises an outer cam ring 20 having an essentially hexagonal shape provided with rounded edges 21 and rounded, inwardly raised portions 22 in between the edges 21. The cam ring 20 is rotating with a wheel connected to the hydraulic motor 8. The cam ring 20 is further divided in direction fields 23, 24 which are defined by the peak of the raised portions 22 and the edges 21. A direction field 23 which extends from an edge 21 to a peak of the raised portion 22 in the clockwise direction corresponds to a clockwise rotational field 23 and such a field 23 will be thus be referred to as a forward rotational field hereinafter. A direction field 24 which extends from an edge 21 to a peak of the raised portion 22 in the counterclockwise direction corresponds to a counterclockwise rotational field 24 and such a field will be thus be referred to as a reverse rotational field 24 hereinafter. The hydraulic motor further includes a central distributor plate 25 also rotating with the wheel and provided with forward channels 26 and reverse channels 27. The channels 26, 27 have 6 openings each which are adapted to fit in and connect hydraulically with hydraulic pistons 28, in this case eight pistons, which are located symmetrically around the rotational centre of the motor 8 on a fixed cylinder block 29. The forward and reverse channels 26, 27 are designed such that the forward channels 26 are located in the same circle sectors as the forward rotational fields 23 of the cam ring 20 and the reverse channels 27 are located in the same circle sectors as the reverse rotational fields 24 for delivering hydraulic liquid to the pistons 28. When either the forward channel 26 or the reverse channel 27 is pressurized, the cam ring 20 and a wheel attached thereto will move correspondingly to provide a forward motion or a reverse motion of a vehicle. In the figure, it is shown that two pistons 28 $d$, $h$ (upper left and lower right pistons) are fitted with and hydraulically connected with openings of the forward channel 26 and ready to receive pressurized hydraulic liquid from the hydraulic system. If the hydraulic liquid in the forward channel 26 is pressurized, the upper left piston 28$g$ and the lower right piston 28$d$ will be pushed outwards and cause a clockwise (forward) motion of the cam ring 20 and a wheel attached to the cam ring 20. As the cam ring 20 and the distributor plate 25 rotates, the connection between the pressurized pistons 28 $d$, $g$ (upper left and lower right pistons) will be disconnected and depressurized such that the pistons 28 $d$, $h$ may easily be returned into the fixed cylinder block 29. While the cam ring 20 is moving in the forward direction, the left piston 28$f$ and right piston 28$c$ will become hydraulically connected to the forward channel 26 and these pistons 28$c$, f will be pushed outwards and provide for a continuing forward motion of the cam ring 20. This procedure will thus continue for the cylinders 28 until the forward channel 26 is depressurized. If a reverse motion is desired instead, the reverse channel 27 is pressurized instead and a reverse motion of the cam ring 20 and an attached wheel is achieved. In order to decouple the hydraulic engine, the space between the cam ring 20 and the cylinder block 29, usually the space in the hydraulic motor defined by a motor housing, could be pressurized such that the pistons will be pushed into the cylinder block 29 and a wheel connected to the hydraulic motor 8 may rotate more or less freely. Hence, the hydraulic motors may be decoupled in an efficient way such that there are small losses due to additional friction from the hydraulic motor when decoupled. Since the hydraulic engines usually not are intended to be used for propulsion of the load carrying truck when travelling above 30 km/h on a road or highway, it is important that the mounting of the hydraulic motors to the vehicle not will contribute with a significant additional rolling resistance when decoupled.

Even though it is exemplified above to have six cams on the cam ring, the number of cams could be different, e.g 9 or 10. Likewise, the number of pistons needs not to be 8 but could be 10 or 12 for example.

In the above described embodiment is the traction system exemplified for a load carrying truck provided with a single pair of rear wheels and a single pair of front wheels.

However, there may be multiple rear wheel pairs as well as multiple front wheel pairs of the load carrying truck. Hence, there may be an additional front axle with hydraulically driven wheel pairs as well as an additional mechanically driven rear axle. There may be further hydraulically driven rear wheel pairs on tag axles or pusher axles of the load carrying truck.

There is a special advantage with this kind of take-off aid system. When configuring the pump to have the displacement variable in both flow directions from zero to full displacement, a so called reversible variable displacement pump, will the transmission ratio in the hydraulic propulsion system become continuously variable from infinity to a minimum level. The hydraulic motors and the pump may for example have a volume ration such that 10 rotations of the pump causes a volume flow corresponding to 1 rotation of the motor at maximum displacement of the pump, i.e. 20 rotations of the pump corresponds to 1 full rotation of 2 hydraulic engines. By using a reduced displacement at take off, it will be possible to deliver maximum torque on the hydraulically driven wheels at start without consuming any significant power from the ICE. In order to be able to start up the hydraulic pump quickly, it may be connected to an outgoing shaft from the engine such that the pump may be activated directly when the internal combustion engine is started. Hence, in order to take off and be able to use the hydraulic system without any undesired delay from starting up the pump, should the pump be connected to an outgoing shaft from the engine. The feature of being able to use the hydraulic propulsion system, together with the mechanical propulsion system, simultaneously at take off may be particularly important when starting on loose or muddy ground. In these cases may a significant slip of a wheel considerably reduce the possibility for the slipping wheel to provide the desired traction due to "digging" in the surface layer and/or ruining an upper surface layer having a more rigid structure than the underlying layer, e.g. a grass lawn. However, the pump may also be connected to an outgoing shaft of the gear box but in this case may the pump not be activated until a gear is selected and a take off using torque from both the hydraulic and mechanical drive systems may not performed as quickly as if the pump is connected to the engine directly. In this case, the arrangement would however have the benefit of being able to control the pumping flow direction, and thus the direction of traction from the hydraulic system, to be dependent on the rotational direction gearbox output shaft and no other control feature should be necessary to provide traction in the right direction from the hydraulic propulsion system, i.e. the pump itself need not to be reversible.

The use of two separate propulsion systems connected to different wheels or different wheel pairs thus allows for a lot of beneficial possibilities for improving an automatic take-off aid function which are within the scope of the invention for the skilled person in the art. For hydraulically driven wheels driven by separate wheel motors may steering angle sensors be used to estimate the desired speed of the wheels. It is furthermore obvious for the skilled person in the art to use known methods and system for detecting wheel speeds, vehicle speed and/or wheel slip to be used as input signals in order to control the automatic take-off aid function.

The invention claimed is:

1. A method for controlling a traction system of a vehicle, the system comprising
    a first traction wheel forming part of a first propulsion system comprising a mechanical drive train including an internal combustion engine which provides a traction force to the first traction wheel via a gearbox,
    a second traction wheel forming part of a second propulsion system comprising a hydraulic pump for powering a hydraulic motor in order to provide a traction force to the second traction wheel,
    at least one sensor indicating a take-off condition,
    a control unit for controlling the second propulsion unit, wherein
    the method comprises
    automatically detecting a take-off condition by the sensor and sending an input to the control unit indicating that a take-off condition is fulfilled
    automatically providing a traction force from the second propulsion system in response to the indication that there is a take-off condition of the vehicle present and/or an indication that a traction is or will be provided by the first traction system,
    manually controlling the torque from the first propulsion unit,
    automatically controlling the second propulsion unit by the control unit, and where the second propulsion system comprises a pair of hydraulic wheel motors connected in parallel and located at a respective steerable front wheel, the second propulsion system being controlled by the control unit without use of valves.

2. A method according to claim 1, wherein the torque from the second propulsion unit is controlled in dependence of the torque from the first propulsion unit during a take-off.

3. A method according to claim 1, wherein the torque from the second propulsion unit during take-off is controlled in dependence of at least one of load on the second traction wheel, a friction coefficient between ground and the second traction wheel, a maximum allowable slip of the second traction wheel or a steering angle of the second traction wheel.

4. A method according to claim 1, wherein the indication that a traction is or will be provided by the first traction system comprises the engagement of a clutch arranged to transmit torque between the internal combustion engine and the gearbox.

5. A method according to claim 1, wherein the indication that a traction is or will be provided by the first traction system comprises a gear shift of the gearbox from neutral to a forward or reverse gear at standstill.

6. A method according to claim 1, wherein the indication that a traction is or will be provided by the first traction system is the acceleration from standstill.

7. A method according to claim 1, wherein there is a fixed minimum torque provided by the second propulsion system when the automatic take-off aid control system is activated and provide this torque until the torque from the mechanically driven wheels is above a certain limit where after the torque from the second propulsion system will increase and be proportional to the torque from the first propulsion system.

8. A method according to claim 1, wherein the torque from second propulsion system will only continue until the speed of the vehicle is above a certain limit.

9. A method according to claim 1, Wherein the drive train control system comprises sensors concerning traction of one or several wheels, such that traction from the wheels are sensed and slip may be detected such that the control is programmed to reduce the torque onto the surface from the wheel(s) connected to the second, hydraulic traction system if there is a slip detected on the hydraulically driven wheels.

10. A method according to claim 1, wherein the hydraulic pump in the hydraulic propulsion system is a reversible variable displacement pump.

11. A traction system of a vehicle, the system comprising
    a first traction wheel forming part of a first propulsion system comprising a mechanical drive train including an internal combustion engine which provides a traction force to the first traction wheel via a gearbox,
    a second traction wheel forming part of a second propulsion system comprising a hydraulic pump for powering a hydraulic motor in order to provide a traction force to the second traction wheel,
    at least one sensor indicating a take-off condition,
    a control unit for controlling, the second propulsion unit, wherein the control unit is programmed to
    automatically detect a take-off condition by the sensor and sending an input to the control unit that a take-off condition is fulfilled automatically provide a traction force from the second propulsion system in response to the indication that there is a take-off condition of the vehicle present and an indication that a traction is or will be provided by the first traction system, automatically control the second propulsion unit by the control unit in dependence of the manually controlled torque from the first propulsion unit, and where the second propulsion system comprises a pair of hydraulic wheel motors connected in parallel and located at a respective steerable front wheel, the second propulsion system comprising no valves.

12. A traction system for a vehicle according to claim 11 wherein the hydraulic pump is connected to an output shaft of the internal combustion engine.

13. A traction system for a vehicle according to claim 11 wherein the hydraulic pump is connected to a pair of hydraulic motors, each one located at each one of a pair of traction wheels, the pair of hydraulic motors arranged in parallel.

14. A heavy vehicle comprising the vehicle, and a traction system for the vehicle, the traction system comprising a first traction wheel forming part of a first propulsion system comprising a mechanical drive train including an internal combustion engine which provides a traction force to the first traction wheel via a gearbox, a second traction wheel forming part of a second propulsion system comprising a hydraulic pump for powering a hydraulic motor in order to provide a traction force to the second traction wheel, at least one sensor indicating a take-off condition, a control unit for controlling the second propulsion unit, wherein the control unit is programmed to automatically detect a take-off condition by the sensor and sending an input to the control unit that a take-off condition is fulfilled automatically provide a traction force from the second propulsion system in response to the indication that there is a take-off condition of the vehicle present and an indication that a traction is or will be provided by the first traction system, automatically control the second propulsion unit by the control unit in dependence of the manually controlled torque from the first propulsion unit, and where the second propulsion system comprises a pair of hydraulic wheel motors connected in parallel and located at a respective steerable front wheel, the second propulsion system comprising no valves.

\* \* \* \* \*